United States Patent
Hammarberg et al.

(10) Patent No.: US 10,913,460 B2
(45) Date of Patent: Feb. 9, 2021

(54) VEHICLE PROPULSION CONTROL USING GEAR DEPENDENT PEDAL MAPPING DURING GEAR SHIFT

(71) Applicant: Volvo Car Corporation, Gothenburg (SE)

(72) Inventors: Carl Magnus Hammarberg, Kungälv (SE); Lisa Julia Helen Wessling, Lindome (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/548,623

(22) Filed: Aug. 22, 2019

(65) Prior Publication Data
US 2020/0269845 A1 Aug. 27, 2020

Related U.S. Application Data

(60) Provisional application No. 62/810,808, filed on Feb. 26, 2019.

(51) Int. Cl.
*B60W 10/04* (2006.01)
*B60W 10/10* (2012.01)
*B60W 30/19* (2012.01)
*B60W 50/038* (2012.01)

(52) U.S. Cl.
CPC .......... *B60W 30/19* (2013.01); *B60W 10/10* (2013.01); *B60W 50/038* (2013.01); *B60W 2540/10* (2013.01)

(58) Field of Classification Search
CPC ...... B60W 10/04; B60W 10/06; B60W 10/08; B60W 10/10; B60W 10/11; B60W 2050/0022; B60W 2050/0026; B60W 2510/1005; B60W 2540/10;
(Continued)

(56) References Cited

U.S. PATENT DOCUMENTS

| | | | |
|---|---|---|---|
| 5,150,635 A * | 9/1992 | Minowa | B60W 10/06 477/43 |
| 8,560,143 B2 * | 10/2013 | Fleming | B60W 50/10 701/1 |

(Continued)

OTHER PUBLICATIONS

Kim et al., "Control of Integrated Powertrain with Electronic Throttle and Automatic Transmission," IEEE Transactions on Control Systems Technology, vol. 15, No. 3, May 2007, pp. 474-482.
(Continued)

*Primary Examiner* — Edwin A Young
(74) *Attorney, Agent, or Firm* — Shumaker & Sieffert, P.A.

(57) ABSTRACT

A controller for a vehicle is configured to determine an amount of torque to be generated by a propulsion source of the vehicle during a shift from an initial gear of a transmission of the vehicle to a target gear of the transmission. The controller is configured to determine the amount of torque based on a position of an acceleration pedal of the vehicle, a first pedal map for the initial gear, and a second pedal map for the target gear. The controller is further configured to output, during the shift from the initial gear to the target gear, one or more commands to control one or more operating parameters of the propulsion source to generate the amount of torque.

20 Claims, 9 Drawing Sheets

(58) Field of Classification Search
CPC . B60W 2710/0666; B60W 2710/1005; B60W 30/19
See application file for complete search history.

(56) References Cited

U.S. PATENT DOCUMENTS

| | | | | |
|---|---|---|---|---|
| 8,584,647 | B2* | 11/2013 | Roberts | F02D 11/105 |
| | | | | 123/198 F |
| 9,708,985 | B1 | 7/2017 | Van ryzin et al. | |
| 2006/0224291 | A1 | 10/2006 | Geist et al. | |
| 2014/0358393 | A1* | 12/2014 | Darnell | F02D 11/105 |
| | | | | 701/70 |
| 2015/0166048 | A1 | 6/2015 | Herrmann et al. | |
| 2017/0008532 | A1* | 1/2017 | Fairgrieve | B60W 10/22 |
| 2019/0023257 | A1 | 1/2019 | Doering et al. | |

OTHER PUBLICATIONS

Blagojevic et al., "A Model for Gear Shifting Optimization in Motor Vehicles," Transactions of Famena, XXXVI-2, Jan. 2012, pp. 51-66.
Extended European Search Report issued in European Application No. 201585791 dated Aug. 12, 2020, 7 pp.

* cited by examiner

VEHICLE PROPULSION CONTROL USING GEAR DEPENDENT PEDAL MAPPING DURING GEAR SHIFT

This application claims the benefit of U.S. Provisional Application No. 62/810,808, filed Feb. 26, 2019, the entire contents of which is hereby incorporated by reference.

TECHNICAL FIELD

The present disclosure relates to propulsion control for motorized vehicles.

BACKGROUND

Vehicle control units (VCU) control the propulsion generated by a propulsion source (e.g., an engine or motor) and provided to the wheels of the vehicle using a pedal map associated with an acceleration pedal. A pedal map may include a 2-dimensional map indicating a value of a propulsion parameter (e.g., an amount of torque, traction force, power, etc.) for various combinations of pedal position and engine or vehicle speed. The VCU determines the value of the propulsion parameter based on the pedal map and adjusts operation of the engine based on the value of the propulsion parameter indicated by the pedal map.

SUMMARY

In general, the disclosed subject matter relates to techniques for enabling a vehicle control unit (VCU) to dynamically control propulsion generated by a propulsion source (e.g., an internal combustion engine or electric motor) of a vehicle during a shift between gears, e.g., from an initial (e.g., current) gear to a target gear, in accordance with one or more techniques of this disclosure. In an example of this disclosure, the VCU includes a pedal map for the initial gear and a different pedal map for the target gear. Rather than utilizing the same pedal map for each gear, the VCU utilizes different pedal maps for at least some of the different gears to control the propulsion generated by the propulsion system.

In one example, the disclosure describes a controller for a vehicle. The controller is configured to: determine an amount of torque to be generated by a propulsion source of the vehicle during a shift from an initial gear of a transmission of the vehicle to a target gear of the transmission, based on a position of an acceleration pedal of the vehicle, a first pedal map for the initial gear, and a second pedal map for the target gear, wherein the second pedal map is different than the first pedal map; and output, during the shift from the initial gear to the target gear, one or more commands to control one or more operating parameters of the propulsion source to generate the amount of torque.

In another example, the disclosure describes a system comprising: means for determining an amount of torque to be generated by a propulsion source of the vehicle during a shift from an initial gear of a transmission of the vehicle to a target gear of the transmission, based on a position of an acceleration pedal of the vehicle, a first pedal map for the initial gear, and a second pedal map for the target gear, wherein the second pedal map is different than the first pedal map; and means for outputting, during the shift from the initial gear to the target gear, one or more commands to control one or more operating parameters of the propulsion source of the vehicle to generate the amount of torque.

In another example, a method includes: determining an amount of torque to be generated by a propulsion source of a vehicle during a shift from an initial gear of a transmission of the vehicle to a target gear of the transmission based on a position of the acceleration pedal, a first pedal map for the initial gear, and a second pedal map for the target gear, wherein the second pedal map is different than the first pedal map; and outputting, during the shift from the initial gear to the target gear, one or more commands to control one or more operating parameters of the propulsion source to generate the amount of torque.

In yet another example, a computer-readable storage medium includes instructions that, when executed by at least one processor of a computing device of a vehicle, cause the at least one processor to: determine an amount of torque to be generated by a propulsion source of a vehicle during a shift from an initial gear of a transmission of the vehicle to a target gear of the transmission, based on a position of an acceleration pedal of the vehicle, a first pedal map for the initial gear, and a second pedal map for the target gear, wherein the second pedal map is different than the first pedal map; and output, during the shift from the initial gear to the target gear, one or more commands to control one or more operating parameters of the propulsion source of the vehicle to generate the amount of torque.

DETAILED DESCRIPTION

In general, the disclosed subject matter relates to techniques for enabling a vehicle control unit (VCU) to dynamically control the propulsion generated by a propulsion source of a vehicle during a shift between gears, e.g., from an initial gear to a target gear, in accordance with one or more techniques of this disclosure. Examples of a propulsion source include an electric motor or internal combustion engine (ICE), among others. In some examples, the VCU utilizes both a pedal map associated with an initial (e.g., current) gear and a different pedal map associated with a target gear to determine a value of a propulsion parameter controlled by the propulsion parameter during the shift between the initial and target gears. Examples of propulsion parameters include the amount of torque (also referred to as crank shaft torque) the engine should generate, traction force, power, percentage of maximum available torque or force, any other parameter used to control the longitudinal motion of the vehicle. Each pedal map may indicate a relationship between a pedal position of an acceleration pedal and a value of the propulsion parameter controlled by the propulsion source. In some examples, the VCU may apply weights to the output of the pedal map associated with the initial gear and the output of the pedal map associated with the target gear to determine a final or composite propulsion parameter (e.g., composite traction force) from the weighted outputs. As one example, the VCU may apply the weights to the output of the pedal maps to determine composite traction force, and hence, an amount of torque to be generated by the propulsion source.

Utilizing different pedals maps for different gears may enable the VCU to improve the driver experience and potentially increase fuel efficiency of the vehicle. Utilizing one pedal map per gear may enable a calibration for higher performance feel, which may enable the general setting to be made less aggressive while maintaining the performance feel at a desired level. In some instances, a less aggressive pedal response may enable the driver to avoid "overshoot" in request (which may otherwise lead to increased fuel consumption) and also enable the transmission to generally use higher gears (which may, for example, enable the engine to run at lower engine speed (e.g., a more efficient operation point)). Blending the output of separate pedal maps for separate gears during a shift from an initial gear to a target gear may enable the vehicle to shift gears more smoothly, e.g., by reducing jolts or lurches during shifting that might otherwise occur when utilizing a single pedal map (e.g., the pedal map for the initial gear) during the shift and using a single, different pedal map for a different gear upon completing the shift. Enabling the vehicle to shift more smoothly may improve the riding experience of persons within the vehicle and may reduce wear on the transmission, which may increase longevity of the transmission.

Figure 1:
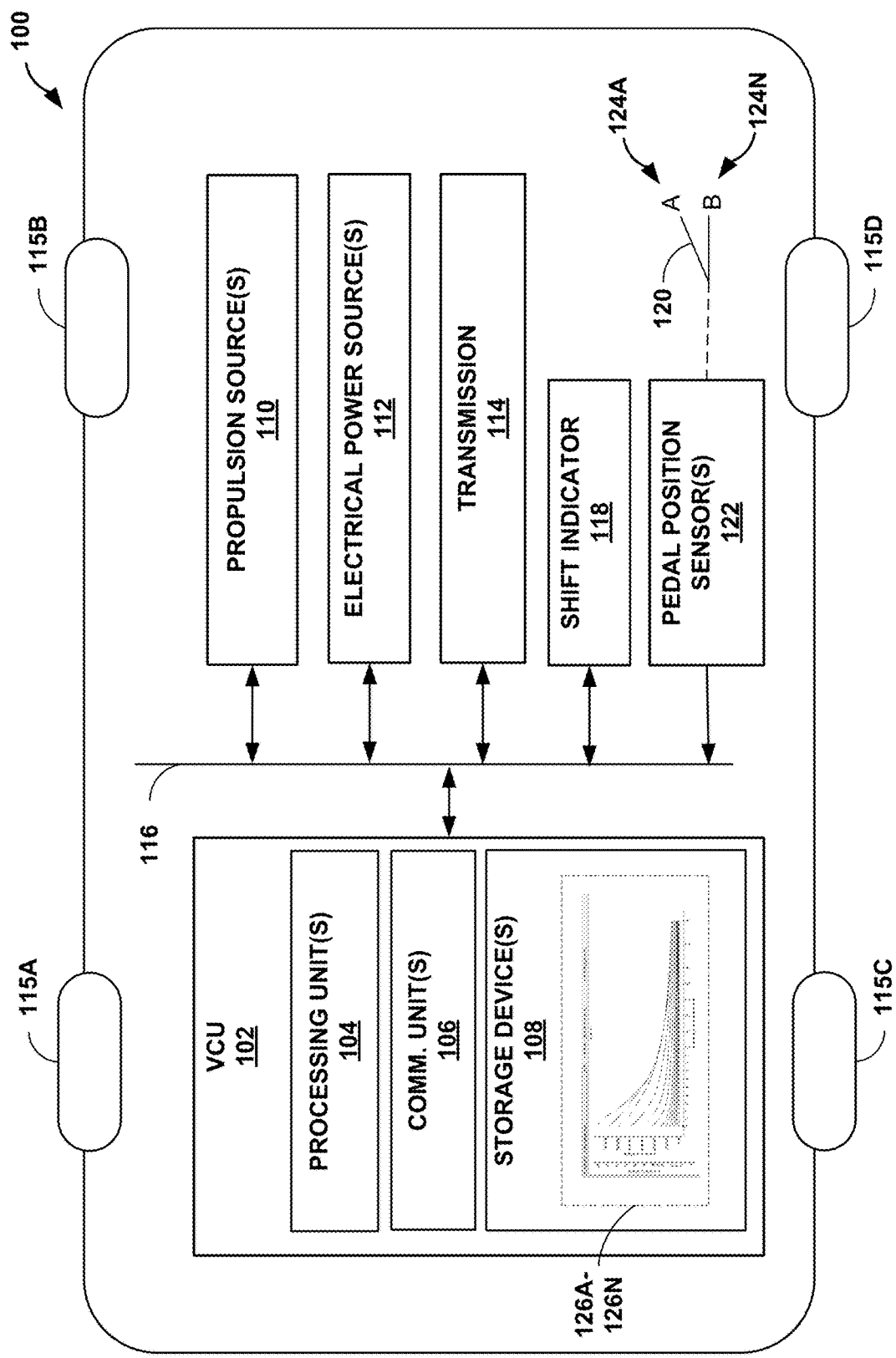
FIG. 1 is a conceptual block diagram illustrating an example vehicle that dynamically controls the propulsion generated by one or more propulsion sources of the vehicle during a shift from one gear to another gear, using gear-dependent pedal mapping, in accordance with one or more techniques of this disclosure.

FIG. 1 is a conceptual block diagram illustrating an example vehicle 100 that dynamically controls the propulsion generated by one or more propulsion sources 110 of vehicle 100 during a shift from one gear to another gear, using gear-dependent pedal mapping, in accordance with one or more techniques of this disclosure. Vehicle 100 may include any type of autonomous, semi-autonomous, or non-autonomous vehicle. Examples of vehicle 100 include cars, trucks, buses, motorcycles, recreational vehicles (RVs), tractors, all-terrain vehicles, watercraft, or any other type of vehicle.

As shown in FIG. 1, vehicle 100 includes at least one vehicle control unit (VCU) 102, one or more propulsion sources 110, one or more electrical power sources 112, a transmission 114, an acceleration pedal 120, and one or more pedal position sensors 122. In the example of FIG. 1, propulsion sources 110 are physically coupled to wheels 115A-115D (collectively, wheels 115) to propel vehicle 100 along a vehicle pathway (e.g., a road). For example, propulsion sources 110 may be coupled to wheels 115 via transmission 114 and one or more respective axles. Propulsion sources 110 may include an internal combustion engine (ICE), one or more electric motors (EM), or a combination therein (e.g., vehicle 100 may be a hybrid vehicle). In some examples, propulsion sources 110 receive electrical power from one or more electrical power sources 112 and/or provide electrical power to electrical power sources 112 (e.g., regenerative braking). In other examples, one or more propulsion sources 110 may be ICE-based and may receive power from fuel, such as gasoline or diesel fuel.

Electrical power sources 112 provide electrical power to one or more electrical components of vehicle 100, such as VCU 102, propulsion sources 110, an instrument cluster, display device, or any other component of vehicle 100 that utilizes electricity. Examples of electrical power sources 112 include a fuel cell, an alternator, or a battery. In some examples, a battery may include an approximately 12V battery to an approximately 48V battery. In some examples, such as examples where vehicle 100 is a hybrid or fully electric vehicle, electrical power sources 112 may include a battery pack that includes a plurality of battery cells and may store even larger amounts of electric energy. In other examples, vehicle 100 may include a fuel tank to carry fuel consumed by one or more ICE-based propulsion sources 110.

Transmission 114 may be a fixed, stepped, or continuously variable transmission (CVT). In one example, transmission 114 includes a plurality of gears that are selectively coupled to propulsion source 110. Transmission 114 may include four gears, five gears, six gears, or any number of gears. As one example, transmission may operate in a low numbered gear (e.g., first gear) at low speeds and higher numbered gears (e.g., fifth gear) at relatively high speeds. In some instances, low numbered gears have a relatively high gear ratio compared to higher numbered gears. In some examples, transmission 114 may be coupled to wheels 115 (e.g., via one or more of a driveshaft, an axle, and/or a differential). As another example, transmission 114 may be coupled to a clutch and shift indicator 118, for example, in the case of a manually shifted transmission.

Vehicle 100 may include a shift indicator 118. In some examples, shift indicator 118 includes a gear stick, gear lever, shift lever, gear selector, etc. For example, a driver of vehicle 100 may utilize shift indicator 118 to manually shift gears of transmission 114. In some examples, shift indicator 118 includes another vehicle control unit, such as a transmission control unit. For example, when shift indicator 118 includes a transmission control unit, the shift indicator 118 may cause transmission 114 to change gears without an input from a driver of vehicle 100.

Acceleration pedal 120 may be mechanically, electrically, or communicatively coupled to propulsion sources 110. In some examples, acceleration pedal 120 is communicatively coupled to propulsion source 110 via pedal position sensors 122 and VCU 102. For example, pedal position sensors 122 may detect the position of acceleration pedal 120 and output an indication of the pedal position to VCU 102. That is, in some examples, pedal position 124 may be a physical position of acceleration pedal 120. Acceleration pedal 120 may be in a pedal position 124 as a driver of vehicle 100 depresses acceleration pedal 120. For instance, the pedal position 124 may vary between a minimum pedal position 124A (e.g., the pedal is not depressed at all) and a maximum pedal position 124N (e.g., the pedal is fully depressed). In some examples, pedal position 124 is a virtual pedal position. For example, when acceleration pedal 120 is not depressed (e.g., when cruise control is engaged or vehicle 101 is operating autonomously), VCU 102 may determine a virtual pedal position to maintain a particular speed for vehicle 101.

VCU 102 includes at least one processing unit 104, at least one communication unit 106, and at least one storage device 108. VCU 102 controls one or more systems of vehicle 100. As one example, VCU 102 may control one or more propulsion sources 110. In some examples, VCU 102 may represent any combination of an engine control unit, a transmission control unit, a powertrain control module, a brake control unit, or a speed control unit, among others.

Processing unit 104 may be implemented as one or more fixed-function hardware processing circuits, one or more programmable hardware processing circuits, or a combination thereof. Fixed-function circuits refer to circuits that provide particular functionality and are pre-set on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

One or more communication units 106 of VCU 102 may communicate with other VCUs 102 of vehicle 100 and/or computing devices physically distinct from vehicle 100 (e.g., cloud computing devices). Communication units 106 include wired and/or wireless communication units. For example, communication units 106 of VCU 102 may transmit data and/or receive data via a Controller Area Network (CAN) bus that communicatively couples VCUs 102 and/or other various components of vehicle 100 (e.g., sensors). As another example, communication units 106 may include cellular (e.g., LTE) radios, Bluetooth™ radios, WiFi™ radios, or any other wireless radios.

Storage device 108 may include one or more non-transitory computer-readable storage devices. Storage device 108 may be configured to store larger amounts of information than typically stored by volatile memory. Storage device 108 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 108 may store program instructions and/or information (e.g., data) that, when executed, cause processing unit 104 to perform the techniques of this disclosure. In the example of FIG. 1, storage device 108 stores a plurality of pedal maps 126A-N (collectively, pedal maps 126), each pedal map of pedal maps 126 corresponding to a respective gear of transmission 114. In some examples, at least some of pedal maps 126 are different from one another, e.g., such that pedal maps for some gears are different and pedals maps for some gears are the same. In other examples, all of pedal maps 126 are different than one another, such that each gear has a unique pedal map that is different form the pedal maps for other gears.

In some examples, storage device 108 may be a temporary memory, meaning that a primary purpose of storage device 108 is not long-term storage. Storage device 108 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Control network 116 interconnects components 102, 110, 114, and 122 for inter-component communications (physically, communicatively, and/or operatively). Control network 116 may interconnect electrical power sources 112 to one or more other components, such as VCU 102. In some examples, control network 116 includes a system bus configured to exchange information or data between components 102, 110, 112, 114, and 122. For example, control network 116 may exchange information between components 102, 110, 112, 114, and 122 according to any communication protocol, such as a controller area network (CAN) bus protocol, media-oriented systems transport (MOST) protocol, and/or transmission control protocol (TCP), among others. As one example, VCU 102 may receive an indication of the pedal position 124 of acceleration pedal 120 from pedal position sensors 122 via control network 116 and output commands to propulsion source 110 to control one or more operational characteristics (e.g., engine speed, throttle valve position, among others) of propulsion source 110 via control network 116.

In accordance with techniques of this disclosure, VCU 102 utilizes a plurality of pedal maps to control propulsion source 110 during a shift from one gear to another gear. For example, VCU 102 may determine the amount of torque to be generated in response to receiving data indicating a shift from an initial gear to a target gear (also referred to as a requested gear) from shift indicator 118. As one example, shift indicator 118 may include a shift lever operated by the driver (e.g., in the case of a manual shift by the driver), or another VCU, such as a transmission control unit (e.g., in the case of an automatic shift). The initial gear and the target gear may be adjacent or successive gears in a sequence of gears (e.g., first gear to second gear, fifth gear to fourth gear, etc.), or may be separated by one or more intervening gears in the sequence of gears (e.g., second gear to third gear, fourth gear to first gear, etc.). The initial gear may refer to a current gear of vehicle 100 and a target gear may refer to a gear requested by the driver or VCU 102. The shift from the initial gear to the target gear may be an up-shift, such as a shift from a particular gear to a higher numbered gear (e.g., from a gear with a particular gear ratio to a gear with a lower gear ratio). In another example, the shift may be a down shift, such as a shift from a particular gear to a lower numbered gear (e.g., from a gear with a particular gear ratio to a gear with a higher gear ratio).

In some examples, VCU 102 determines the value of the propulsion parameter based on at least in part the pedal position 124 of acceleration pedal 120 and respective pedal maps 126 for the various gears of transmission 114. VCU 102 may receive data indicating a pedal position 124 of acceleration pedal 120 from one or more pedal position sensors 122. For example, VCU 102 may receive the data indicating that acceleration pedal 120 is depressed to (or depressed approximately to) any of pedal positions 124.

As illustrated in FIG. 2, each pedal map of pedal maps 126 includes data indicating a value of the propulsion parameter for different combinations of pedal position 124 of acceleration pedal 120 and vehicle speed or motor speed. For example, the inputs to each of pedal maps 126 include vehicle speed (or motor speed) and pedal position. In some examples, the output of each pedal map includes a traction force. In such examples, VCU 102 may determine the requested amount of torque based on the traction force. For example, VCU 102 may calculate the torque based on the traction force, transmission ratio, tire radius, torque converter ratio, transmission losses, or a variety of different factors according to techniques known in the art. As another example, the output of each of pedal maps 126 may include a requested amount of torque (e.g., an amount of torque to be generated by propulsion source 110). In other words, VCU 102 may determine the traction force for a given gear based at least in part by applying the speed of vehicle 100 and the pedal position 124 of acceleration pedal 120 to one of a plurality of different pedal maps 126 that is associated with the respective gear.

In some examples, VCU 102 may apply the speed of vehicle 100 and pedal position 124 to a pedal map 126 to determine the value of the propulsion parameter. For example, when the propulsion parameter includes a traction force, for a given gear shift from an initial gear to a target gear, VCU 102 may determine a traction force associated with an initial gear (e.g., current gear, such as fourth gear) by applying the speed of the vehicle 100 and the pedal position 124 to a pedal map (e.g., 126A) for the initial gear, and determine a traction force associated with a target gear (e.g., fifth gear) by applying the speed of vehicle 100 and the pedal position 124 to a pedal map (e.g., 126B) for the target gear. In such examples, VCU 102 determines the traction force associated with the initial gear (e.g., fourth gear in this example), determines a traction force associated with the target gear (e.g., fifth gear in this example), and determines a composite traction force by weighting the traction force associated with initial gear by a weight associated with initial gear and weighting a traction force associated with the target gear by a weight associated with the target gear.

In some examples, VCU 102 determines a respective weight or factor for each gear. VCU 102 may determine the weight associated with each respective gear (i.e., initial gear and target gear). VCU 102 may determine the respective weighting factor based on a transmission ratio. VCU 102 may determine the transmission ratio based on the input shaft speed and the output shaft speed. For instance, VCU 102 may divide the input shaft speed by the output shaft speed to determine the transmission ratio. In some examples, VCU 102 determines the weighting factor based on the gear ratio for the initial gear, the gear ratio for the target gear, and the transmission ratio. For example, VCU 102 may determine that the transmission ratio is relatively close to the gear ratio for the initial gear compared to the gear ratio for the target gear. In such examples, VCU 102 may assign a relatively high weight to the value of the propulsion parameter associated with the initial gear and a relatively low weight to the value of the propulsion parameter associated with the target gear. In some examples, when the transmission ratio matches a gear ratio for a particular gear, the weighting factor for that particular gear will be 1, and the weighting factors for all other gears will be zero.

VCU 102 may adjust the weights for the traction forces associated with the initial and target gears as the transmission ratio changes. For example, at a second time (e.g., after the first time), VCU 102 may assign a lower weight (e.g., 15%) to the traction force associated with initial gear and a relatively higher weight (e.g., 85%) to the traction force associated with target gear. VCU 102 may re-calculate the weights associated with the initial and target gears during the shift. As one example, VCU 102 may re-calculate the weights approximately every 10 milliseconds, every 20 milliseconds, or any other period of time.

In some examples, VCU 102 determines a composite traction force based on the weighted traction forces associated with the respective gears. In particular, VCU 102 may determine a composite traction force (also referred to as a final traction force request) based on the traction force associated with the initial gear, the traction force associated with the target gear, and the respective weights applied to the respective traction forces of the initial and target gears. For example, at the first time, VCU 102 may multiply the traction force associated with fourth gear by the weight associated with fourth gear for the first time, multiply the traction force associated with fifth gear by the weight associated with fifth gear for the first time, and sum the values to determine the composite traction force for the first time. In such examples, VCU 102 weighs the traction force associated with the initial gear more heavily immediately after receiving the indication of the shift from the initial gear to the target gear, and weighs the traction force associated with the target gear more heavily as the transmission ratio changes during the shift from the initial gear to the target gear.

Responsive to determining the composite traction force, VCU 102 determines an amount of torque to be generated by propulsion source 110 based on the composite traction force. For example, VCU 102 may determine the crank shaft torque based on the transmission ratio, final drive ratio, tire radius, torque converter ratio, estimated transmission losses, or a combination thereof. In some examples, vehicle 100 may include a plurality of propulsion sources 110 such that VCU 102 may determine how to distribute the traction force for each of the plurality of propulsion sources 110. In one example, vehicle 100 includes an ICE propulsion source 110 and an electric motor propulsion source 110. In such examples, VCU 102 determines the torque to be generated by the ICE propulsion source based on the traction force contributions (positive or negative) from each of the electric motor propulsion source.

VCU 102 determines one or more operating parameters of propulsion source 110 that are associated with the amount of torque to be generated by propulsion source 110. The operating parameters of propulsion source 110 includes a throttle position of a throttle of propulsion source 110, spark retard, boost pressure, fuel pressure, exhaust gas recirculation (EGR) rate, to name just a few. In some examples, storage device 108 may include a mapping table that maps torque to one or more operating characteristics of propulsion source 110. In this manner, VCU 102 may determine a traction force based on the pedal maps 126 for the initial gear and target gear, determine an amount of torque to be generated by propulsion source 110 based on the traction force, and control one or more operating parameters of propulsion source 110 based on the torque as the vehicle shifts from the initial gear to the target gear.

Responsive to determining the one or more operating parameters associated with the amount of torque to be generated by propulsion source 110, VCU 102 outputs a command to propulsion source 110 to control (e.g., adjust) the operating parameters of propulsion source 110. For example, in an example where propulsion source includes an internal combustion engine, VCU 102 may output a command to adjust the throttle position (e.g., open the throttle further), spark retard, boost pressure, fuel pressure, or a combination thereof, which may change the torque output by propulsion source 110.

In some examples, a component of propulsion source 110 may receive the command and control one or more operating parameters of propulsion source 110 based on the command. For example, propulsion source 110 may include an electronic throttle actuator that receives the command from VCU 102 and adjusts (e.g., opens or closes) the throttle of propulsion source 110. Thus, VCU 102 may control one or more components of propulsion source 110 to change one or more operating parameters of propulsion source 110.

In this way, VCU 102 may utilize different pedal maps that are each associated with different gears to control the propulsion generated by the propulsion source. Utilizing different pedals maps for different gears (e.g., one pedal map per gear) may enable VCU 102 to more optimally balance fuel consumption and vehicle performance feel. Further, VCU 102 may utilize multiple different pedal maps during a shift from an initial gear to a target gear. By utilizing pedal maps for the initial gear and the target gear during a shift from the initial gear to the target gear (e.g., while a shift is in progress), VCU 102 may generate a smooth torque request and enable vehicle 100 to shift gears more smoothly. By enabling the vehicle to shift more smoothly, VCU 102 may improve the experience of the driver or other passengers within vehicle 100. Further, techniques of this disclosure may reduce wear on the transmission, thereby potentially increasing the longevity of the transmission.

Figure 2A:
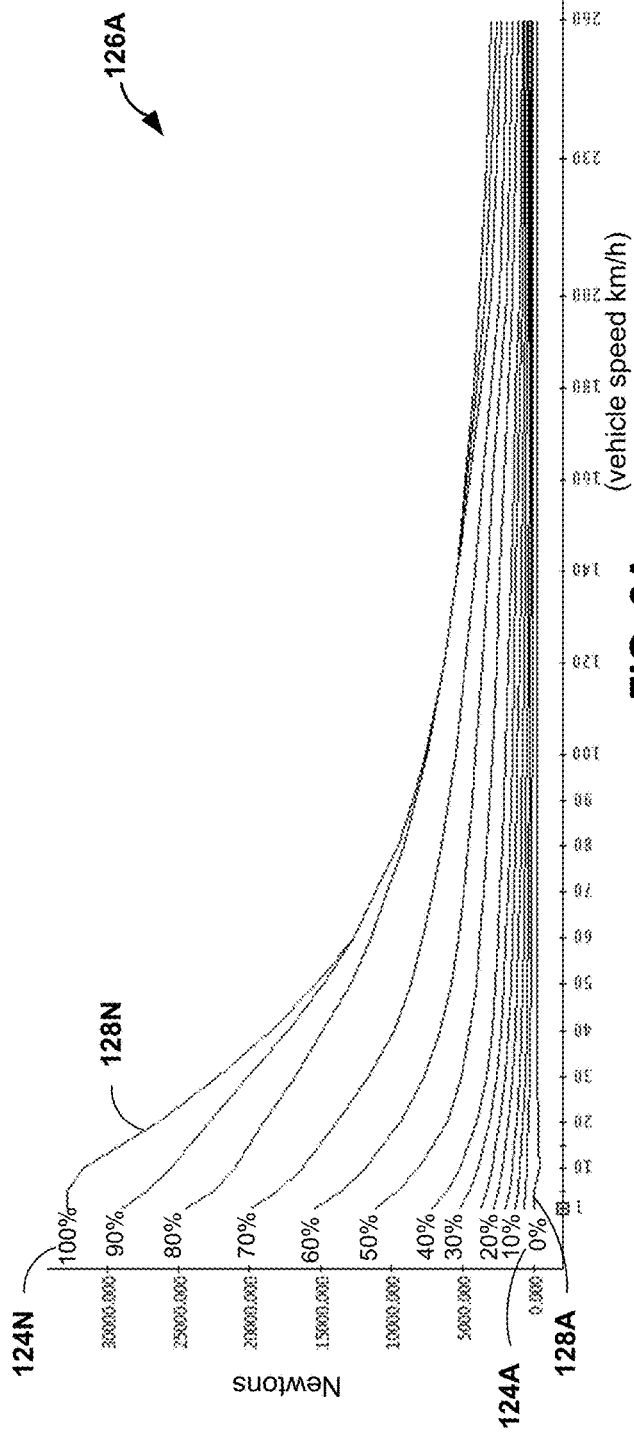
FIG. 2A is a graph diagram illustrating an example pedal map of the example vehicle of FIG. 1, in accordance with one or more aspects of this disclosure.

FIG. 2A is a graph diagram illustrating an example pedal map of the example vehicle of FIG. 1, in accordance with one or more aspects of this disclosure. Pedal map 126A is associated with one or more gears of vehicle 100 of FIG. 1. In some examples, pedal map 126A may be associated with a single gear. In other examples, pedal map 126A may be associated with a plurality of gears.

Pedal map 126A may include data indicating a value of a propulsion parameter associated with propulsion source 110 of FIG. 1 for different combinations of pedal position 124 of acceleration pedal 120 and vehicle speed (or motor speed). In the example of FIG. 2A, the x-axis of pedal map 126A represents the vehicle speed of vehicle 100 of FIG. 1 (e.g., in kilometers per hour or miles per hour). In some examples, the x-axis may represent a speed of propulsion source 110 (e.g., in revolutions per minute, or RPMs). The y-axis of pedal map 126A may represent a traction force request. In another example, the y-axis may represent an amount of torque. Curves 128A-128N (collectively, curves 128) indicate the relationship between the x-axis and the y-axis for various pedal positions 124A-124N, respectively. In one example, curve 128A indicates the relationship between the speed of vehicle 100 and the traction force request when acceleration pedal 120 is at pedal position 124A (e.g., 0% depressed) and curve 128N indicates the relationship between the speed of vehicle 100 and the traction force request when acceleration pedal 120 is at pedal position 124N (e.g., 100% or fully depressed). In other words, curves 128A-128N are each associated with a respective pedal position 124A-124N, such that VCU 102 may apply the speed of vehicle 100 to a particular curve 128 associated with a particular pedal position 124 to determine the traction force request (and hence amount of torque to be generated by propulsion source 110). In this way, VCU 102 may determine the traction force request or the amount of torque to be generated by propulsion source 110 based on the vehicle speed (or engine speed) and pedal position 124. For example, VCU 102 may receive data indicating that acceleration pedal 120 is depressed to a particular pedal position of a plurality of pedal positions, such as pedal position 124N (e.g., fully depressed). In this example, with pedal position 124N, VCU 102 may receive data indicating that the speed of vehicle 100 is approximately 100 KM/h, and may output data indicating the requested traction force is approximately 7620 Newtons using pedal map 126A.

Figure 2B:
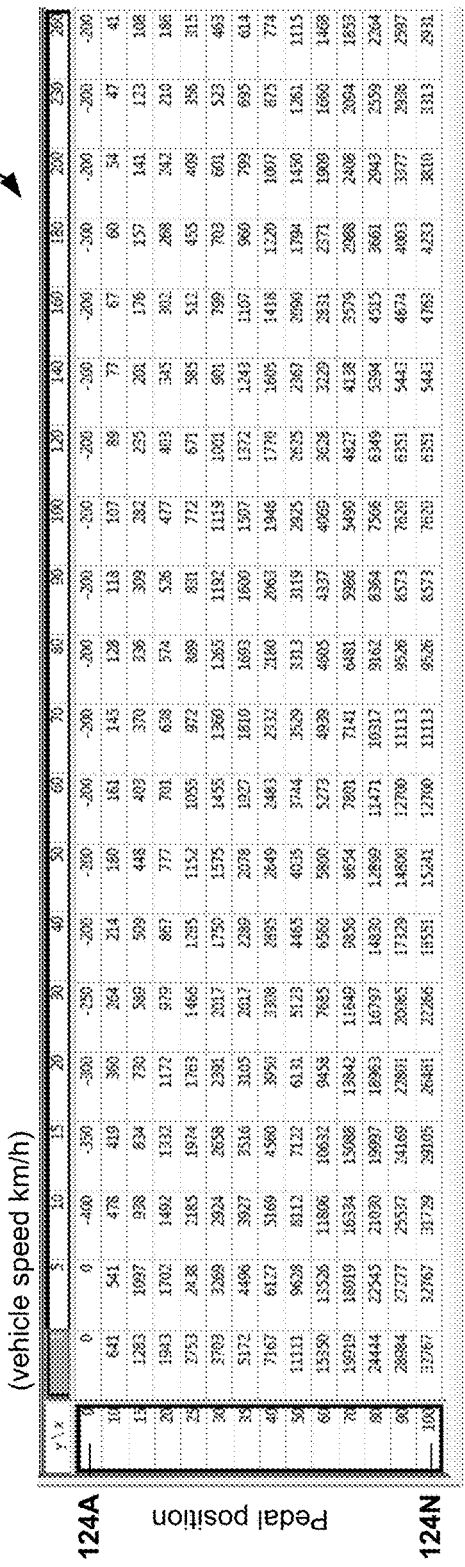
FIG. 2B is a table illustrating an example pedal map of the example vehicle of FIG. 1, in accordance with one or more aspects of this disclosure.

FIG. 2B is a table illustrating an example pedal map of the example vehicle of FIG. 1, in accordance with one or more aspects of this disclosure. In some examples, VCU 102 may include pedal map 126A as a lookup table. As described above with reference to FIG. 2A, pedal map 126A may include data indicating a traction force request or torque for various combinations of vehicle speed (or engine speed) and pedal position 124 of acceleration pedal 120. In the example of FIG. 2B, the x-axis of pedal map 126A represents the vehicle speed of vehicle 100 of FIG. 1 (e.g., in kilometers per hour or miles per hour). In some examples, the x-axis may represent a speed of propulsion source 110 (e.g., in revolutions per minute, or RPMs). The y-axis of pedal map 126A may represent a pedal position 124 of acceleration pedal 120 (e.g., 0% depressed, 5% depressed, 50% depressed, 100% depressed, etc.). In the example of FIG. 2B, the mapped value (e.g., the value at the intersection of a particular value on the x-axis and a particular value on the y-axis) may represent a traction force request. In another example, the mapped value may represent an amount of torque to be generated by propulsion source 110.

Figure 3A:
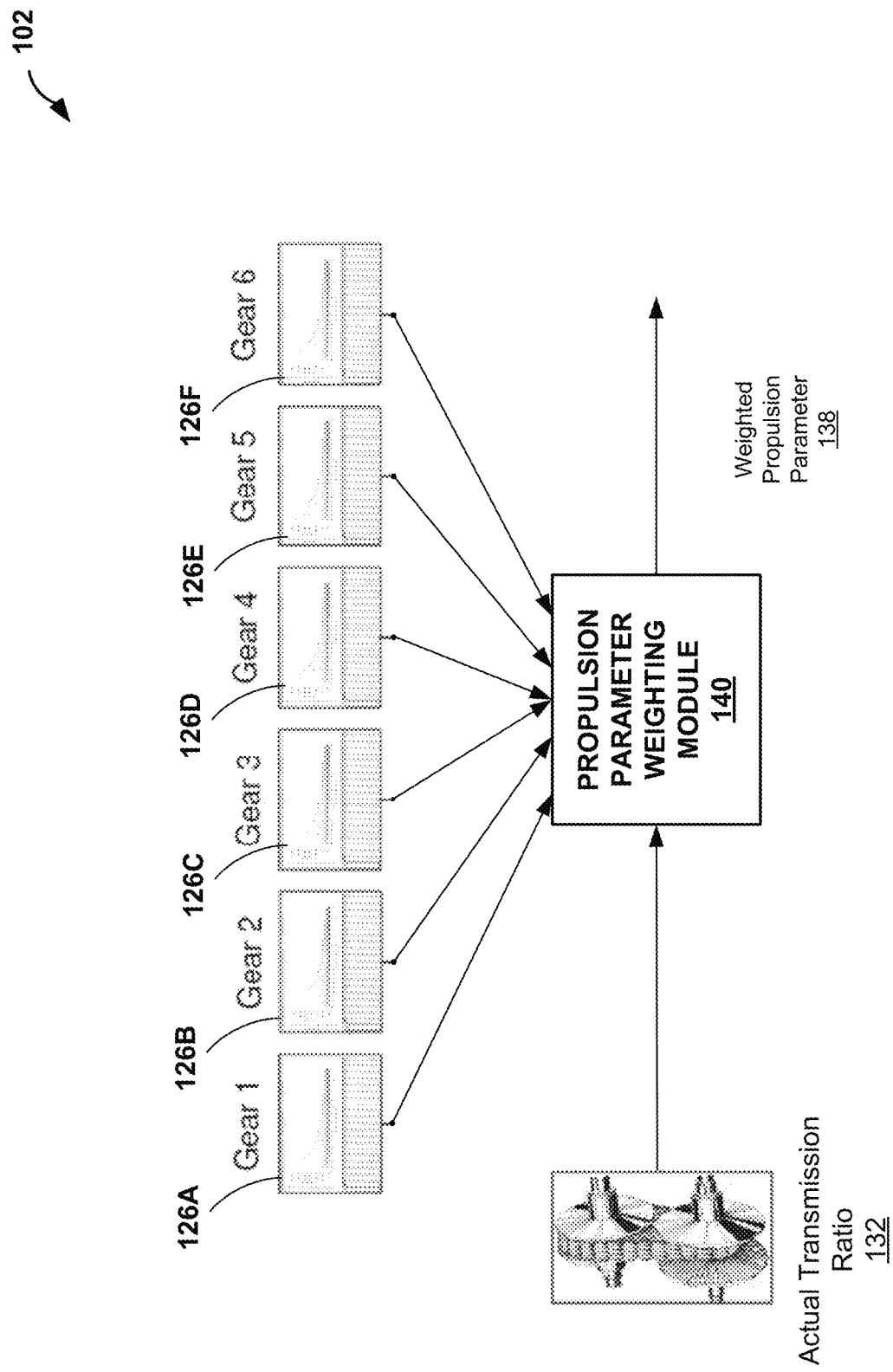
FIG. 3A is a conceptual diagram illustrating an example vehicle control unit of the example vehicle of FIG. 1, in accordance with one or more aspects of this disclosure.
Figure 6:
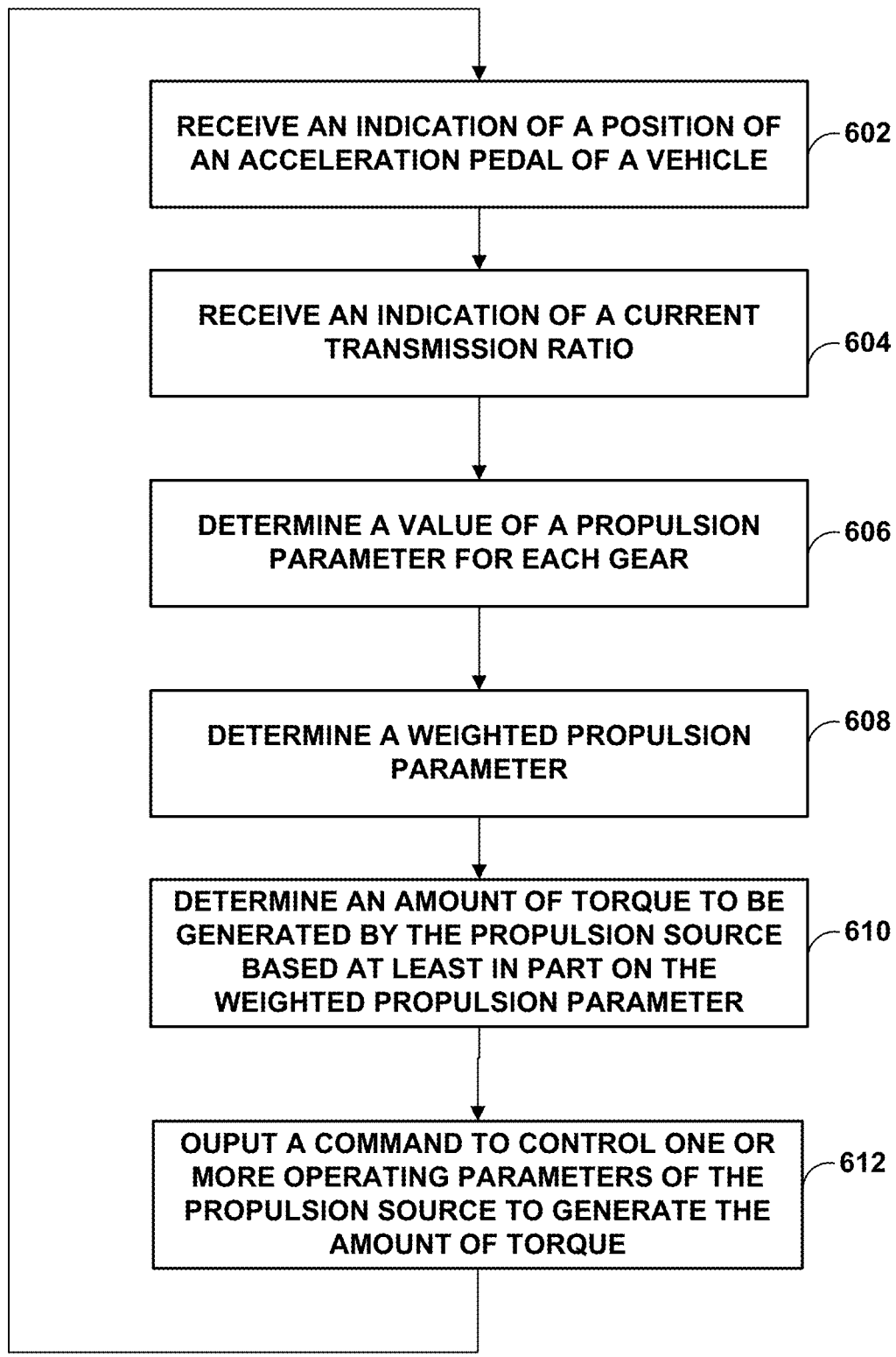
FIG. 6 is a flowchart illustrating example operations of an example vehicle control unit, in accordance with one or more aspects of this disclosure.

FIG. 3A is a conceptual diagram illustrating a vehicle control unit (VCU) 102 of the example vehicle 100 of FIG. 1, in accordance with one or more aspects of this disclosure. VCU 102 may include a propulsion parameter weighting (PPW) module 140. Storage device 108 of VCU 102 may include pedal maps 126A-126F (collectively, pedal maps 126). Each pedal map 126 may define a relationship between vehicle speed and traction force request or torque for each of a plurality of different pedal positions. In some examples, VCU 102 includes one pedal map per gear of transmission 114. For instance, as shown in FIG. 6, transmission 114 includes six gears and VCU 102 includes six different pedal maps. In some examples, utilizing different pedal maps 126 for each of the different gears may provide a better balance between fuel consumption (e.g., real-world fuel consumption)/controllability and driving performance/feel.

PPW module 140 may receive each of pedal maps 126 and an actual transmission ratio 132. PPW module 140 determines, based on the pedal maps 126 for the respective gears, a value of a propulsion parameter (e.g., traction force request, torque, etc.) for each pedal map. For example, PPW module 140 may determine a value of a propulsion parameter for each pedal map based on the vehicle speed (or motor speed) and pedal position 124 of acceleration pedal 120. In some examples, PPW module 140 weights the value of the propulsion parameter for each pedal map based on the actual transmission ratio 132. For example, during a shift from an initial gear to a target gear, PPW module 140 may determine a weight to apply to the value of the propulsion parameter for the pedal map corresponding to the initial gear based on the actual transmission ratio, the gear ratio for the initial gear, and the gear ratio for the target gear, as described above with reference to FIG. 1. Similarly, PPW module 140 may determine a weight to apply to the value of the propulsion parameter for the pedal map corresponding to the target gear.

PPW module 140 determines a weighted propulsion parameter 138 (also referred to as a composite propulsion parameter 138) based on the weights for the respective pedal maps 126 and the value of the propulsion parameters for each of the pedal maps. For example, when the propulsion parameter includes a traction force request, PPW module 140 may determine a weighted or composite traction force request based on the weighted traction force requests for each respective pedal map 126. In such examples, VCU 102 determines a torque to be generated by propulsion source 110 based on the composite traction force request. In some examples, PPW module 140 determines a torque (e.g., rather than a traction force request) based on pedals maps 126 by applying pedal maps 126 to the vehicle speed (or motor speed) and pedal position 124 of acceleration pedal 120.

Figure 3B:
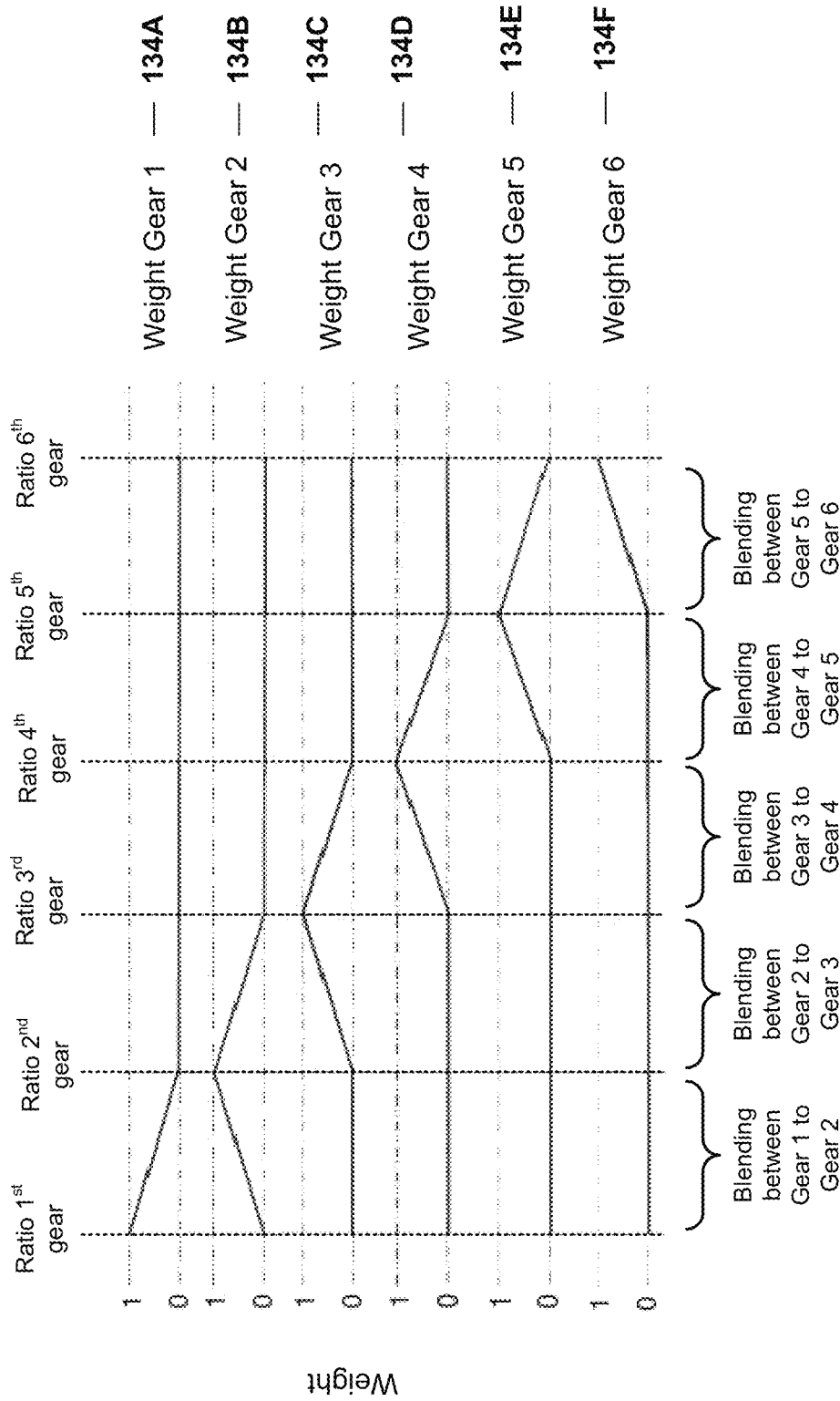
FIG. 3B is a conceptual diagram illustrating an example weights for pedal maps of the example vehicle of FIG. 1, in accordance with one or more aspects of the present disclosure.

FIG. 3B is a conceptual diagram illustrating example weights 134A-134F (collectively, weights 134) for pedal maps 126 of the example vehicle of FIG. 1, in accordance with one or more aspects of this disclosure. As illustrated in FIG. 3B, VCU 102 may determine weights 134 or factors for each gear during the shift. For example, as illustrated in FIG. 3B, VCU 102 may determine that the weight 134A for first gear is 1 (e.g., 100%) when transmission 114 is in first gear, and that the weight 134A for first gear decreases from 1 to 0 (e.g., 0%) during the shift from first gear to second gear along a range of weights while the weight 134B for second gear increases from 0 to 1 during the shift from first gear to second gear along the range of weights.

In some scenarios, VCU 102 determines weights 134 based on the actual (e.g., current) transmission ratio and the gear ratio of the various gears. For example, when the actual transmission ratio is between the gear ratio for first gear and the gear ratio for second gear, VCU 102 determines the weight for the output of the pedal map for first gear and the weight for the output of the pedal map for second gear based on the actual transmission ratio, the gear ratio for first gear, and the gear ratio for second gear in a manner similar to the techniques described with reference to FIG. 1. As another example, when the actual transmission ratio is between the gear ratio for second gear and third gear, VCU 102 determines the weight for the output of the pedal map for second gear and the weight for the output of the pedal map for third gear based on the actual transmission ratio, the gear ratio for second gear, and the gear ratio for third gear. Similarly, VCU 102 may determine weights 134B-134F for gears 2-6, respectively.

Figure 3C:
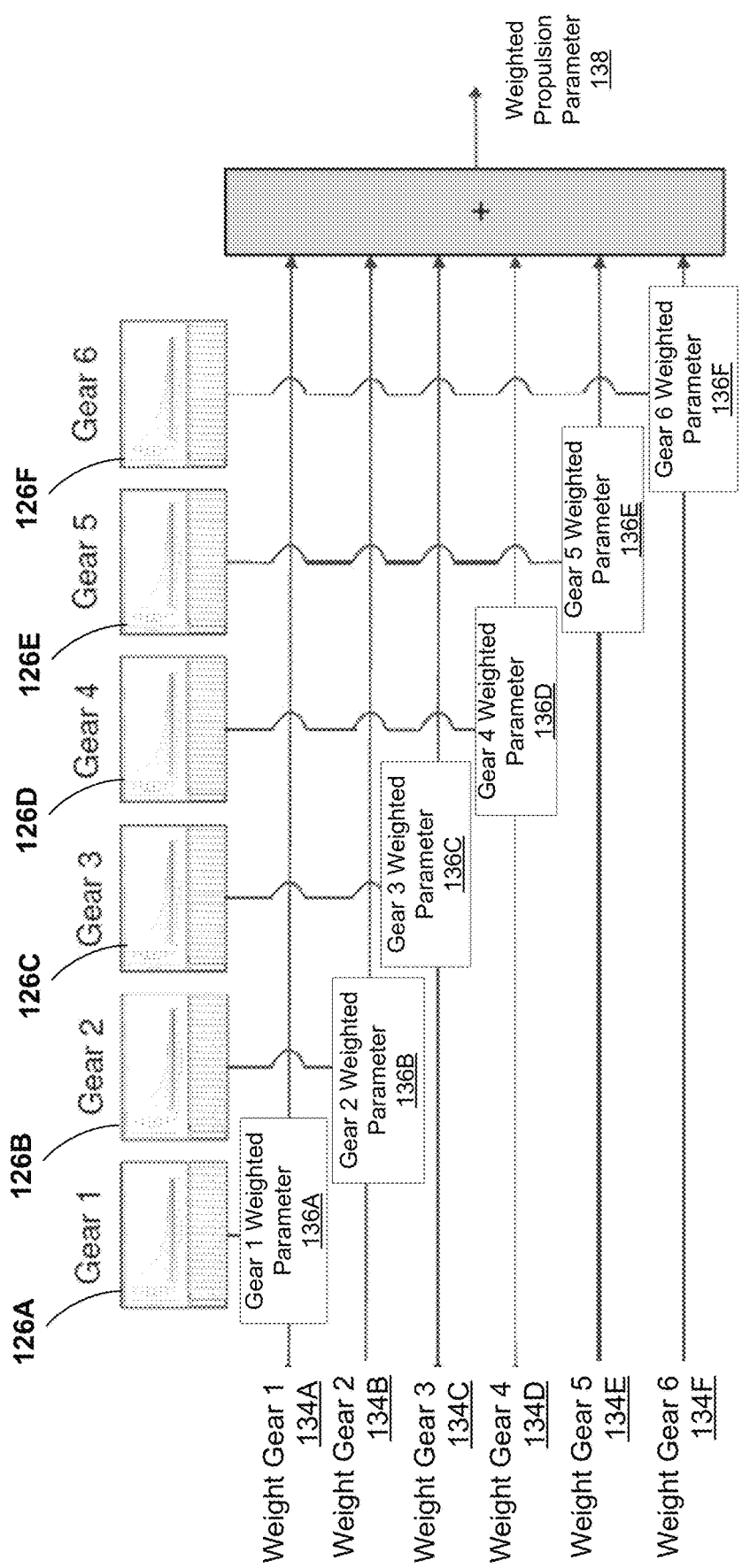
FIG. 3C is a conceptual diagram illustrating an example vehicle control unit of the example vehicle of FIG. 1, in accordance with one or more aspects of this disclosure.

FIG. 3C is a conceptual diagram illustrating an example vehicle control unit 102 of the example vehicle of FIG. 1, in accordance with one or more aspects of this disclosure. As illustrated in FIG. 3C, PPW module 140 (shown in FIG. 3A) determines the weighted propulsion parameter 138 (e.g., a weighted or composite traction force request, also referred to as final traction force request), based on pedal maps 126 and weights 134. For example, PPW module 140 may determine weighted propulsion parameters (e.g., traction force request) 136A-136F for each respective gear of transmission 114 based on the respective pedal maps 126 and weights 134 (e.g., by multiplying the value of the propulsion parameter as output by pedal maps 126 and the respective weights). Responsive to determining each of the weighted propulsion parameters 136, PPW module 140 may sum the weighted propulsion parameters 136 to determine the weighted propulsion parameter (e.g., a composite traction force request) 138.

PPW module 140 may determine an amount of torque to be generated by propulsion source 110 based on the composite traction force request 138. In one example, PPW module 140 may determine the requested amount of torque to be generated by propulsion source 110 based on the composite traction force, transmission ratio, tire radius, torque converter ratio, transmission losses, or a variety of different factors according to techniques known in the art. By determining a composite traction force request using pedal maps for both the initial gear and the target gear of a shift between gears, PPW module 140 may generate a smooth torque request and enable transmission 114 to shift gears more smoothly, which may reduce wear on the transmission 114.

Figure 4:
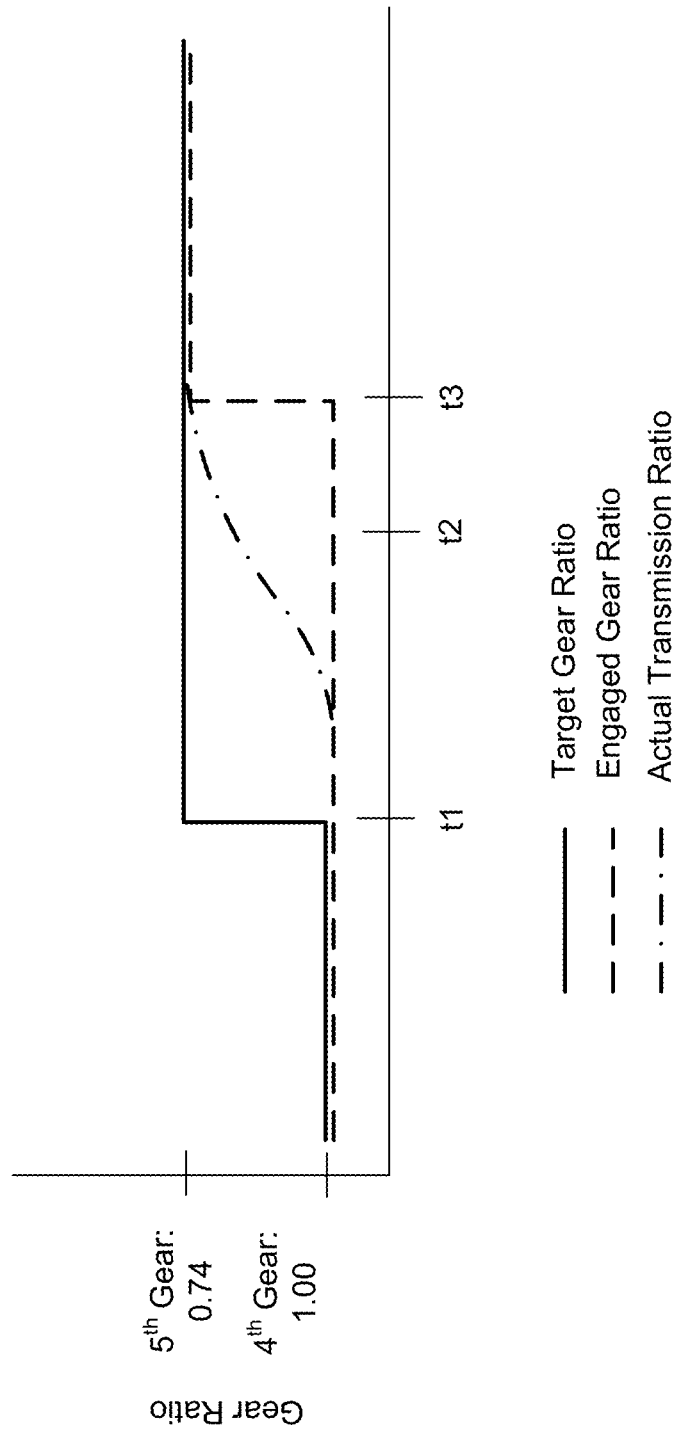
FIG. 4 is a timing diagram illustrating a shift from an initial gear to a target gear, in accordance with one or more aspects of this disclosure.

FIG. 4 is a timing diagram illustrating a shift from an initial gear to a target gear, in accordance with one or more aspects of this disclosure. FIG. 4 is described with reference to vehicle 100 of FIG. 1. As illustrated in FIG. 4, VCU 102 dynamically determines a value of a propulsion parameter of propulsion source 110 during a shift in progress from one gear to another gear.

VCU 102 may receive data indicating a pedal position 124 of acceleration pedal 120 from one or more pedal position sensors 122. For example, VCU 102 may receive the data indicating that acceleration pedal 120 is depressed to (or depressed approximately to) a particular pedal position of pedal positions 124.

In some examples, VCU 102 receives an indication of a change in the transmission ratio. In one example, the transmission ratio may change based on a request to shift from an initial gear to a target gear. In one example, the request to shift is received from a shift lever operated by the driver (e.g., in the case of a manual shift). In another example, the request to shift is received from another VCU, such as a transmission control module (e.g., in the case of an automatic shift). In the example illustrated in FIG. 4, VCU 102 receives an indication of a request to shift between successive gears. In other words, in the example of FIG. 4, the initial gear (e.g., the current gear of transmission 114) is fourth gear and the target gear, also referred to as the requested gear, is fifth gear. While the shift illustrated in FIG. 4 is an upshift, in some examples, the shift may be a downshift. Further, while the shift illustrated in FIG. 4 is between successive or adjacent gears, in some examples, the shift may be between non-successive gears. In other words, there may be one or more intervening gears between the initial gear and the target gear (e.g., a shift from third gear to fifth gear). Responsive to receiving the indication of the change in the transmission ratio (e.g., which may be caused by a request to shift from the initial gear to the target gear), VCU 102 may determine a value of a propulsion parameter (e.g., an amount of torque) associated with propulsion source 110.

VCU 102 may determine the value of the propulsion parameter based at least in part on the pedal position 124 of acceleration pedal 120, a pedal map for one gear, and a pedal map for an adjacent gear. In the example of FIG. 4, VCU 102 determines the value of the propulsion parameter based on a pedal map 126A for the initial gear, and a pedal map 126B for the adjacent, target gear. In some examples, pedal maps 126 indicate the value of the propulsion parameter for various combinations of pedal position 124 and vehicle speed or motor speed. In one example, the value of the propulsion parameter output by pedals maps 126 is a torque. VCU 102 may determine a torque associated with the initial gear by applying the speed of vehicle 100 and the pedal position 124 of acceleration pedal 120 to the pedal map 126A for the initial gear. Similarly, VCU 102 may determine a torque associated with the target gear by applying the speed of vehicle 100 and the pedal position 124 of acceleration pedal 120 to the pedal map 126B for the target gear. In other words, in some examples, the weighted propulsion parameter 138 includes a composite torque to be generated by propulsion source 110. In this way, VCU 102 may, in some examples, determine the torque to be generated by propulsion source 110 based on weighting the torque associated with the initial gear and the torque associated with the target gear.

In some examples, each of pedal maps 126 indicates a traction force request for various combinations of pedal position 124 and vehicle speed or motor speed. The weighted propulsion parameter 138 of FIG. 3 may be a composite traction force request, such that VCU 102 may determine the composite traction force request and determine the amount of torque to be generated by propulsion source 110 based on the composite traction force request. For example, VCU 102 may determine a traction force request associated with the initial gear by applying the speed of vehicle 100 and the pedal position 124 of acceleration pedal 120 to the pedal map 126A for the initial gear. Similarly, VCU 102 may determine a traction force request associated with the target gear by applying the speed of vehicle 100 and the pedal position 124 of acceleration pedal 120 to the pedal map 126B for the target gear. VCU 102 may determine the composite traction force request based on weighting the traction force request associated with the initial gear and the traction force request associated with the target gear. In such examples, VCU 102 may determine the torque to be generated by propulsion source 110 based on the composite traction force request.

VCU 102 may determine a respective weight or factor for each gear. In some examples, VCU 102 determines the weight associated with each respective gear (i.e., initial gear and target gear) based the actual transmission ratio, the gear ratio for the initial gear, and the gear ratio for the target gear. As illustrated in FIG. 4, at time t1 (e.g., upon receiving the indication of the shift from the initial gear to the target gear), VCU 102 may weight the value of the propulsion parameter for the initial gear (e.g., fourth gear) more heavily than the value of the propulsion parameter for the target gear (e.g., fifth gear). For example, VCU 102 may determine the weight for the initial gear ($4^{th}$ gear in this example) is approximately 95% when the actual transmission ratio is very close to the gear ratio for the initial gear.

VCU 102 may adjust the weights during the shift from the initial gear to the target gear (e.g., prior to the shift to the target gear being complete). For example, at a later time t2, VCU 102 may decrease the weight of the value of the propulsion parameter for the initial gear and increase the weight of the value of the propulsion parameter for the target gear as the actual transmission ratio approaches the gear ratio for the target gear ($5^{th}$ gear in this example). Thus, as shown in FIG. 4, VCU 102 determines the weighted propulsion parameter (e.g., composite traction force request), approaches the value of the propulsion parameter associated with the target gear (e.g., fifth gear). VCU 102 may adjust the weights a plurality of times (e.g., 50, 100, 200 times per second), such that at time t3, VCU 102 weights the value of the propulsion parameter for the target gear (e.g., fifth gear) more heavily than value of the propulsion parameter for the initial gear (e.g., fourth gear). For instance, at time t3, VCU 102 may determine the weight for the target gear is approximately 100% and the weight for the initial gear is approximately 0%. At approximately time t3, the shift from the initial gear to the target gear may be complete, such that after time t3, VCU 102 may determine the value of the propulsion parameter based on the pedal map for the target gear (e.g., which has become the current gear) without using the pedal map for the initial gear, until receiving an indication of a subsequent change in the transmission ratio (e.g., caused by a gear shift).

In some examples, VCU 102 determines an amount of torque to be generated by propulsion source 110 based on the weighted propulsion parameter 138 (e.g., composite traction force request). For example, VCU 102 may determine the torque based on the weighted propulsion parameter 138, transmission ratio, tire radius, torque converter ratio, transmission losses, or a variety of different factors according to techniques known in the art. In another example, the value of the propulsion parameter output by pedal maps 126 includes an amount of torque to be generated by propulsion source 110, such that VCU 102 may weight the output of pedal maps 126 as described above and weight the amount of torque associated with the respective gears to determine the amount of torque to be generated by propulsion source 110.

VCU 102 may determine one or more operating parameters of propulsion source 110 that are associated with the amount of torque to be generated by propulsion source 110. Example operating parameters of propulsion source 110 includes a throttle position of a throttle of propulsion source 110, park retard, boost pressure, fuel pressure, exhaust gas recirculation (EGR) rate, among others. In some examples, storage device 108 may include a mapping table that maps torque to one or more operating characteristics of propulsion source 110. For example, storage device 108 may include a mapping table that maps torque to an engine throttle position.

In some examples, VCU 102 outputs a command to propulsion source 110 to control (e.g., adjust) the operating parameters of propulsion source 110 in response to determining the one or more operating parameters associated with the amount of torque to be generated by propulsion source 110. For example, VCU 102 may output a command to adjust the throttle position (e.g., open the throttle further), spark retard, boost pressure, fuel pressure, or a combination thereof, which may change the torque output by propulsion source 110.

Figure 5:
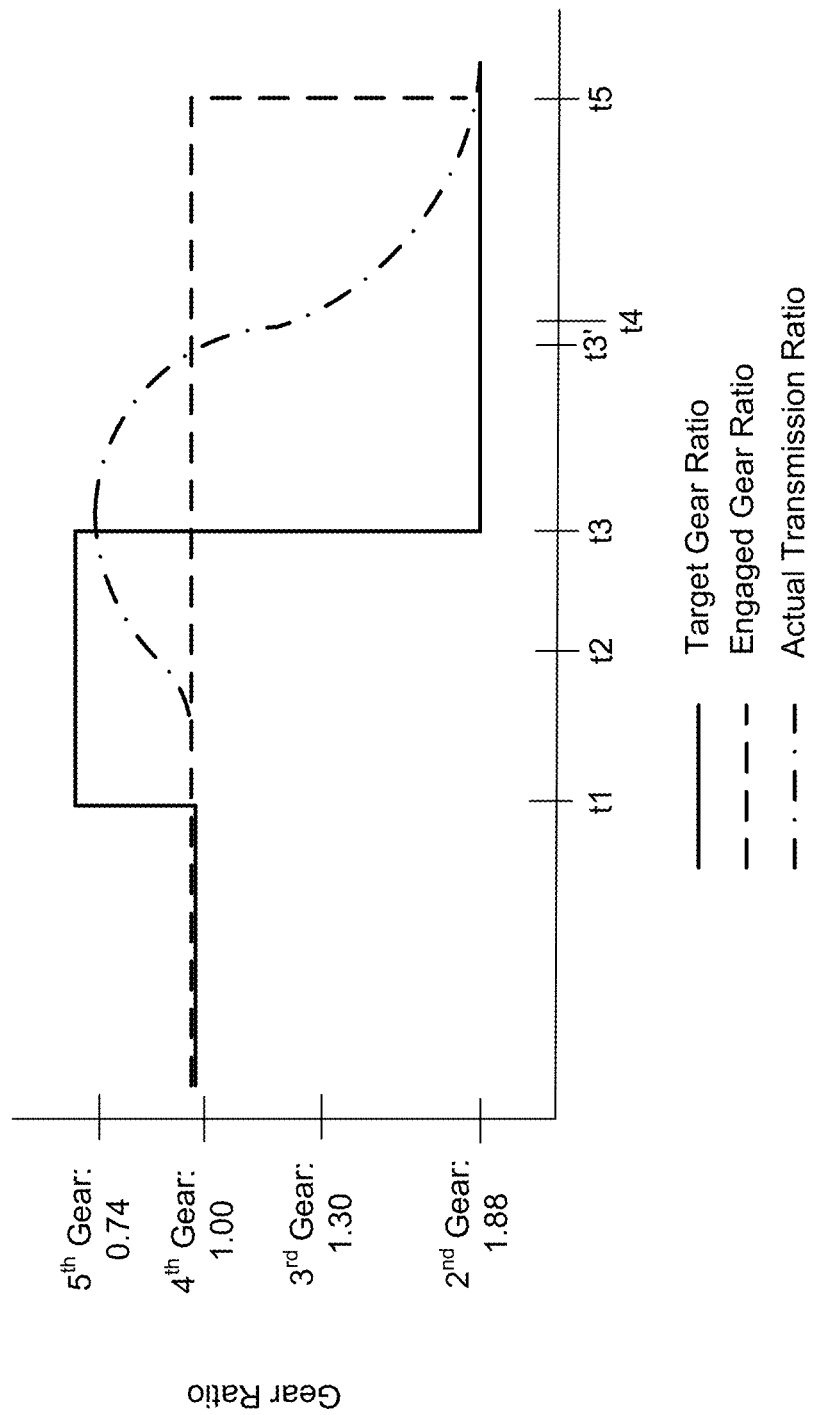
FIG. 5 is a timing diagram illustrating a shift from an initial gear to a target gear, in accordance with one or more aspects of this disclosure.

FIG. 5 is a timing diagram illustrating a shift from an initial gear to a target gear, in accordance with one or more aspects of this disclosure. FIG. 5 is described with reference to vehicle 100 of FIG. 1. As illustrated in FIG. 5, VCU 102 dynamically determines a value of a propulsion parameter of propulsion source 110 during a shift in progress from one gear to another gear. FIG. 5 illustrates an example where VCU 102 receives an indication of a request to shift from a current gear to a first target gear and an indication of a subsequent request to shift to a second target gear prior to completing the shift to the first target gear. VCU 102 may receive data indicating a pedal position 124 of acceleration pedal 120 from one or more pedal position sensors 122. For example, VCU 102 may receive the data indicating that acceleration pedal 120 is depressed to (or depressed approximately to) pedal position 124N (e.g., approximately fully depressed).

In some examples, VCU 102 receives an indication of a shift from an initial gear to a first target gear. For example, as illustrated in FIG. 5, VCU 102 receives an indication of a shift from the initial gear (e.g., fourth gear) to a first target gear (e.g., fifth gear) at time t1. VCU 102 may determine a value of a propulsion parameter (e.g., an amount of torque to be generated by propulsion source 110) during the shift from the initial gear to the first target gear, as described above with reference to FIGS. 1-4 above.

VCU 102 may receive an indication of a change in the actual transmission ratio of transmission 114. The change in the actual transmission ratio may be caused by, in some examples, a shift to a second target gear prior to completing the shift to the first target gear. In the example of FIG. 5, VCU 102 receives an indication of a shift to a second target gear (e.g., second gear) at time t3 prior to completing the shift to the first target gear. As described above, each shift may be a manual shift or an automatic shift, and each shift may be an upshift or a downshift. In some instances, the shift from one gear to another gear may be a shift between successive gears. In some instances, VCU 102 receives an indication of a shift between non-successive gears. For instance, as illustrated in FIG. 5, at time t3, transmission 114 includes at least one intervening gear (e.g., third gear) between the initial gear (e.g., fourth gear since the shift to fifth gear was not completed prior to receiving the indication of the shift to second gear at time t3) and the target gear (e.g., second gear). In the example of FIG. 5, the initial gear (e.g., fourth gear) is numbered between the number of the first target gear (e.g., fifth gear) and the second target gear (e.g., second gear). Said another way, in some instances, the initial gear may have a gear ratio between a gear ratio of the first target gear and a gear ratio of the second target gear. In other words, the shift to the first target gear and the shift to the second target gear may be opposite shifts, such as an upshift followed by a downshift. While the shift to the first target gear is illustrated in FIG. 5 and the shift to the second target gear are illustrated as opposite shifts, in some instances, the shift to the first target gear and the shift to the second target gear may both be upshifts or downshifts.

Responsive to receiving the indication of a change in the transmission ratio at time t3, VCU 102 may determine a value of a propulsion parameter of propulsion source 110 during the shift from the initial gear to the second target gear.

VCU 102 may determine the value of the propulsion parameter (e.g., a traction force request) based on, at least in part, pedal position 124 of acceleration pedal 120, a pedal map 126A for the initial gear, a pedal map 126C for the second target gear. In some instances, the initial gear and the second target gear are successive gears. In some instances, such as the example of FIG. 5, the initial gear (fourth gear in this example) and the second target gear (second gear in this example) are separated by at least one intervening gear (third gear in the example of FIG. 5). In examples where the initial gear and the second target gear (or the initial target gear) are separated by one or more intervening gears, VCU 102 may determine the value of the propulsion parameter based on the pedal map for the initial gear, the pedal map for the second target gear, and pedals maps for each of the intervening gears. For example, VCU 102 may determine a value of the propulsion parameter associated with the initial gear by applying the speed of vehicle 100 and the pedal position 124 of acceleration pedal 120 to the pedal map 126A for the initial gear. Similarly, VCU 102 may determine a value of a propulsion parameter associated with the second target gear by applying the speed of vehicle 100 and the pedal position 124 of acceleration pedal 120 to the pedal map 126C for the second target gear. In some examples, VCU 102 determine a value of a propulsion parameter associated with each respective intervening gear between the initial gear and the second target gear based on pedal maps 126 for each intervening gear.

In some examples, VCU 102 determines a weight for the propulsion parameter associated with the initial gear, a weight for the propulsion parameter associated with the second target gear, and a weight for the propulsion parameter associated with each of the intervening gears. In one example, VCU 102 may determine the weight for a propulsion parameter associated with a given gear is 100% and the weight for the propulsion parameters associated with other gears is 0% in response to determining the actual transmission ratio matches the gear ratio for the given gear.

In another example, VCU 102 may determine the weights for two adjacent gears are between 0% and 100% (with a sum of the two weights adding to 100%) in response to determining the actual transmission ratio is between the gear ratios for two adjacent gears. In such examples, VCU 102 may determine the weights for all of the other gears are each equal to 0%. In other words, VCU 102 may assign a non-zero weight to one gear or two adjacent gears, and may assign a weight of zero to all of the other gears. Responsive to determining the weights for the respective propulsion parameters, VCU 102 may determine a weighted propulsion parameter (e.g., a composite traction force request) based on the weights for the respective gears and the values of the propulsion parameters for the respective gears.

In the example of FIG. 5, at time t3', VCU 102 may determine the weighted propulsion parameter based on a pedal map for an intervening gear (e.g., third gear) and the pedal map for the initial gear. In the example of FIG. 5, VCU 102 may determine the value of a propulsion parameter for third gear based on a pedal map 126 associated with third gear. For example, VCU 102 may apply the pedal position 124 of acceleration pedal 120 to the pedal map 126 for the intervening gear (e.g., third gear) to determine a value of a propulsion parameter (e.g., traction force request) for the intervening gear. In one example, VCU 102 weights the propulsion parameter for the intervening gear and the propulsion parameter for the initial gear at time t3'. In such examples, VCU 102 may determine the weights for the propulsion parameters for other gears (e.g., gears other than third and fourth gear) are zero.

VCU 102 may adjust the weights during the shift from the initial gear to the target gear (e.g., prior to the shift to the target gear being complete). In some examples, VCU 102 adjusts the weights periodically (e.g., 50, 100, 200 times per second). For example, at a later time t4 illustrated in FIG. 5, VCU 102 may decrease the weight of the traction force request for the initial gear and increase the weight of the traction force request for the intervening gear as the actual transmission ratio approaches the gear ratio for the intervening gear. For example, at time t4, VCU 102 may determine that the actual transmission ratio is slightly less than the gear ratio for third gear, such that VCU 102 weights the traction force request for the intervening gear(s) (e.g., third gear in the example of FIG. 5) more heavily (e.g., approximately 95%) than the traction force request for the initial gear (e.g., approximately 5%) or the second target gear (0%). In other words, in the example of FIG. 5, VCU 102 may assign a higher weight to third gear compared to the weight for fourth gear, and all other gears may be assigned a weight of 0.

At time t5, VCU 102 may determine the weight for the second target gear (second gear in this example) is approximately 100%, the weight for the intervening gear (third gear in this example) is approximately 0%, and the weight for the initial gear is 0%. At approximately time t5, the shift from the initial gear to the second target gear may be complete, such that after time t5, VCU 102 may determine the value of the propulsion parameters for propulsion source 110 based on the pedal map for the second target gear (e.g., which has become the current gear) without using the pedal map for the initial gear or any intervening gears, until receiving an indication of a subsequent shift.

Responsive to determining the weighted propulsion parameter 138 (e.g., composite traction force request), VCU 102 may determine an amount of torque to be generated by propulsion source 110 based at least in part on the weighted propulsion parameter 138. VCU 102 may determine one or more operating parameters of propulsion source 110 that are associated with the amount of torque to be generated by propulsion source 110. For example, VCU 102 may determine the torque based on the weighted propulsion parameter (e.g. a traction force request) and a transmission ratio, tire radius, torque converter ratio, transmission losses, or a variety of different factors according to techniques known in the art. VCU 102 may determine one or more operating characteristics of propulsion source 110 based at least in part on the torque. Responsive to determining the operating characteristics of propulsion source 110, VCU 102 may output a command to propulsion source 110 to control (e.g., adjust) the operating parameters of propulsion source 110, such as a command to adjust the throttle position, spark retard, fuel pressure, boost pressure, and the like.

FIG. 6 is a flowchart illustrating example operations of an example vehicle control unit, in accordance with one or more aspects of this disclosure. FIG. 6 is described with reference to vehicle 100 of FIG. 1.

VCU 102 of vehicle 100 receives an indication of a pedal position 124 of an acceleration pedal 120 (602). In some examples, VCU 102 receives the indication of pedal position 124 of acceleration pedal 120 from pedal position sensors 122.

VCU 102 may receive an indication of a change in the transmission ratio of transmission 114 (604). In some examples, the change in the transmission ratio may be caused by a shift from an initial gear to a target gear of the vehicle.

VCU 102 determines a value of a propulsion parameter of propulsion source 110 for each gear (606). Examples of propulsion parameters include a traction force request, an amount of torque, power, percentage of maximum available torque or force, any other parameter used to control the longitudinal motion of the vehicle. VCU 102 may determine the value of the propulsion parameter based at least in part on the pedal position 124 of acceleration pedal 120, a pedal map 126A for the initial gear, and a pedal map 126B for the target gear (606). In some examples, VCU 102 determines a traction force request for the initial gear and a traction force request for the target gear by applying pedal maps 126A and 126B, respectively, to pedal position 124. In one example, VCU 102 applies the pedal maps 126 for the initial and target gears to the pedal position 124 and speed of the vehicle (or engine speed) to determine the traction force request for the respective gears.

In some instances, VCU 102 determines a weighted propulsion parameter (608). VCU 102 may determine the weighted propulsion parameter (e.g., a composite traction force request) based on the value of the propulsion parameter for the initial gear and the propulsion parameter for the target gear. For instance, VCU 102 may weight each of the traction force request for the initial gear and the traction force request for the target gear to determine the composite traction force request.

Responsive to determining the weighted propulsion parameter, VCU 102 may determine the amount of torque to be generated by propulsion source 110 based at least in part on the weighted propulsion parameter (610). For example, VCU 102 may calculate the torque based on the weighted propulsion parameter (e.g., traction force request), transmission ratio, tire radius, torque converter ratio, transmission losses, or other factor, according to techniques known in the art.

VCU 102 outputs a command to control one or more operating parameters of propulsion source 110 to generate the amount of torque (612). VCU 102 may determine one or more operating parameters of propulsion source 110 that are associated with the amount of torque to be generated by propulsion source 110. In one instance, VCU 102 may determine a throttle position of the throttle of propulsion source 110, a spark retard, a boost pressure, a fuel pressure, or a combination thereof that enables propulsion source 110 to generate the requested amount of torque. Responsive to determining the operating parameters associated with the requested amount of torque, VCU 102 may output a command to propulsion source 110 to control (e.g., adjust) the operating parameters of propulsion source 110 to cause propulsion source 110 to generate the amount of torque. For example, VCU 102 may output a command to adjust the throttle position (e.g., open the throttle further), spark retard, boost pressure, fuel pressure, or a combination thereof, which may change the torque output by propulsion source 110.

After outputting the command to control one or more operating parameters of propulsion source 110 to generate the amount of torque, VCU 102 may determine an updated amount of torque to be generated by propulsion source 110. For example, VCU 102 may receive data indicating the position 124 of acceleration pedal 120 has changed or the transmission ratio has changed. In such examples, VCU 102 may determine an updated amount of torque based on the pedal maps and pedal position, and may output another command to propulsion source 110 to cause propulsion source 110 to generate the updated amount of torque.

Figure 7:
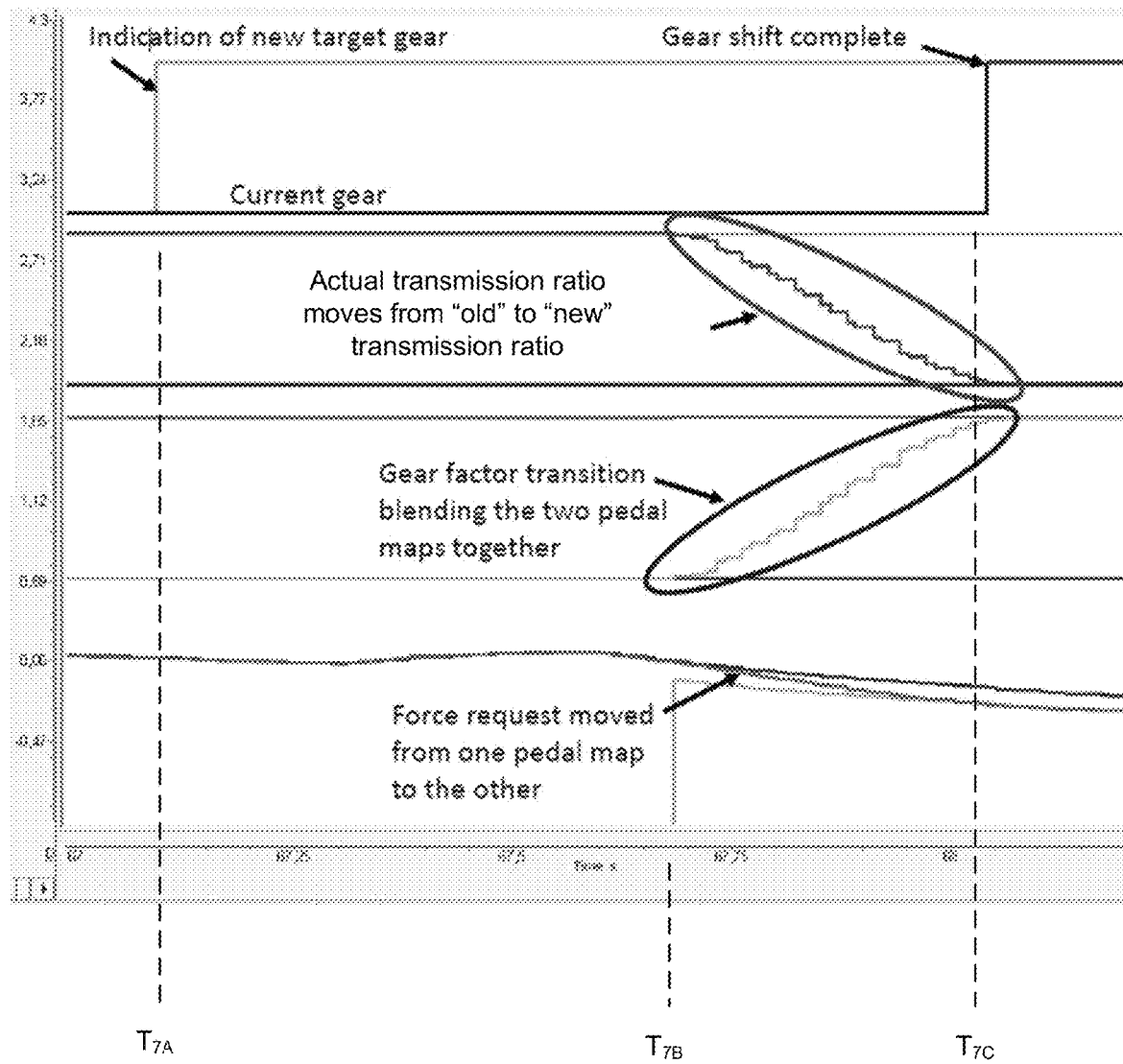
FIG. 7 is a timing diagram illustrating example operations of an example vehicle control unit, in accordance with one or more aspects of this disclosure.

FIG. 7 is a timing diagram illustrating example operations of an example vehicle control unit, in accordance with one or more aspects of this disclosure. FIG. 7 is described with reference to vehicle 100 of FIG. 1.

At time $T_{7A}$, VCU 102 of vehicle 100 receives an indication of a shift to a new target gear. For example, VCU 102 may receive the indication of the shift from shift indicator 118 (e.g., during a manual shift) or from another VCU (e.g., during an automatic shift). In the example of FIG. 7, the current gear of transmission 114 is a lower numbered gear (i.e., having a higher gear ratio) relative to the target gear (i.e., a higher numbered gear having a lower gear ratio). VCU 102 may receive an indication of a pedal position 124 of an acceleration pedal 120. In another example, VCU 102 receives an indication of a change in the current transmission ratio.

At time $T_{7B}$, transmission 114 may receive an indication of the actual transmission ratio as the transmission ratio changes between the gear ratio for the initial gear and the gear ratio for the target gear. In the example of FIG. 7, the actual transmission ratio decreases, VCU 102 iteratively determines the weighted propulsion parameter. For example, VCU 102 may utilize a pedal map for the initial or current gear and a pedal map for the adjacent or target gear and determine a value of a propulsion parameter of propulsion source 110 for each pedal map. VCU 102 may determine a weight for each pedal map based on the actual transmission ratio, the gear ratio for the initial gear, and the gear ratio for the adjacent gear. For example, VCU 102 may assign a higher weight to the value output by the pedal map for the adjacent or target gear as the actual transmission ratio gets closer to the actual gear ratio for the adjacent gear.

In the example of FIG. 7, at time $T_{7C}$, the gear shift is complete. In such examples, VCU 102 may weight the output of the pedal map for the adjacent or target gear at 100%.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A controller for a vehicle, the controller configured to:
   determine an amount of torque to be generated by a propulsion source of the vehicle during a shift from an initial gear of a transmission of the vehicle to a target gear of the transmission, based on a position of an acceleration pedal of the vehicle, a first pedal map for the initial gear, and a second pedal map for the target gear, wherein the second pedal map is different than the first pedal map; and
   output, during the shift from the initial gear to the target gear, one or more commands to control one or more operating parameters of the propulsion source to generate the amount of torque.

2. The controller of claim 1, wherein the controller is configured to determine the amount of torque to be generated by the propulsion source by at least being configured to:
   determine, based on the first pedal map for the initial gear and the position of the acceleration pedal, a value of a propulsion parameter associated with the initial gear;
   determine, based on the second pedal map for the target gear and the position of the acceleration pedal, a value of a propulsion parameter associated with the target gear;
   determine a weighted propulsion parameter based on a weighted combination of the value of the propulsion parameter associated with the initial gear and the value of the propulsion parameter associated with the target gear; and
   determine the amount of torque to be generated by the propulsion source based on the weighted propulsion parameter.

3. The controller of claim 2, wherein the controller is configured to determine the weighted propulsion factor parameter by at least being configured to:
   receive an indication of a transmission ratio of the transmission;
   determine, based on the transmission ratio, a gear ratio for the initial gear, and a gear ratio for the target gear, a first weight for the propulsion parameter associated with the initial gear and a second weight for the propulsion parameter associated with the target gear; and
   determine, the weighted propulsion parameter based on weighting the value of the propulsion parameter associated with the initial gear by the first weight and the value of the propulsion parameter associated with the target gear by the second weight.

4. The controller of claim 3, wherein the amount of torque is a first amount of torque, and wherein the controller is further configured to:
receive an indication of an updated transmission ratio;
determine, based at least in part on the updated transmission ratio, an updated first weight for the propulsion parameter associated with the initial gear and an updated second weight for the propulsion parameter associated with the target gear; and
determine an updated weighted propulsion parameter based on weighting the value of the propulsion parameter associated with the initial gear by the updated first weight and the value of the propulsion parameter associated with the target gear by the updated second weight.

5. The controller of claim 2, wherein the controller is further configured to determine the amount of torque by at least being configured to:
determine, based at least in part on the weighted propulsion parameter, the amount of torque to be generated by the propulsion source.

6. The controller of claim 1, wherein the controller is further configured to determine the amount of torque to be generated by the propulsion source during the shift from the initial gear to the target gear based on a speed of the vehicle.

7. The controller of claim 1, wherein the initial gear and the target gear are separated by an intervening gear, wherein the controller is further configured to determine the amount of torque to be generated by the propulsion source based on a third pedal map for the intervening gear and the first pedal map for the initial gear at a first time, and wherein the controller is further configured to determine the amount of torque to be generated by the propulsion source based on the third pedal map for the intervening gear and the second pedal map for the target gear at a second time.

8. The controller of claim 1, wherein the amount of torque is a first amount of torque, the target gear is a first target gear, and the position of the acceleration pedal is a first position, and wherein the controller is further configured to:
prior to completing the shift from the initial gear to the first target gear, receive an indication of an updated transmission ratio during a shift from the initial gear to a second target gear;
after receiving the indication of the updated transmission ratio:
determine, based on a second position of the acceleration pedal, the first pedal map for the initial gear, and a third pedal map for the second target gear, a second amount of torque to be generated by the propulsion source during the shift to the second target gear; and
output a command to control the one or more operating parameters of the propulsion source to generate the second amount of torque.

9. The controller of claim 8, wherein the initial gear is a gear numbered between the first target gear and the second target gear and has a gear ratio between a gear ratio of the first target gear and a gear ratio of the second target gear.

10. The controller of claim 1, wherein outputting the one or more commands includes outputting a command to adjust a throttle, a spark retard, a fuel pressure, or a boost pressure of the propulsion source.

11. The controller of claim 1, wherein the shift from the initial gear to the target gear includes an up-shift or a down-shift.

12. A system comprising:
means for determining an amount of torque to be generated by a propulsion source of a vehicle during a shift from an initial gear of a transmission of the vehicle to a target gear of the transmission, based on a position of an acceleration pedal of the vehicle, a first pedal map for the initial gear, and a second pedal map for the target gear, wherein the second pedal map is different than the first pedal map; and
means for outputting, during the shift from the initial gear to the target gear, one or more commands to control one or more operating parameters of the propulsion source of the vehicle to generate the amount of torque.

13. A method comprising:
determining an amount of torque to be generated by a propulsion source of a vehicle during a shift from an initial gear of a transmission of the vehicle to a target gear of the transmission based on a position of an acceleration pedal, a first pedal map for the initial gear, and a second pedal map for the target gear, wherein the second pedal map is different than the first pedal map; and
outputting, during the shift from the initial gear to the target gear, one or more commands to control one or more operating parameters of the propulsion source to generate the amount of torque.

14. The method of claim 13, wherein determining the amount of torque to be generated by the propulsion source comprises:
determining a value of a propulsion parameter associated with the initial gear based on the first pedal map for the initial gear and the position of the acceleration pedal;
determining a value of a propulsion parameter associated with the target gear based on the second pedal map for the target gear and the position of the acceleration pedal;
determining a weighted propulsion parameter based on a weighted combination of the value of the propulsion parameter associated with the initial gear and the value of the propulsion parameter associated with the target gear; and
determining the amount of torque to be generated by the propulsion source based on the weighted propulsion parameter.

15. The method of claim 14, wherein determining the weighted propulsion parameter comprises:
receiving an indication of a transmission ratio of the transmission;
determining, based on the transmission ratio, a gear ratio for the initial gear, and a gear ratio for the target gear, a first weight for the propulsion parameter associated with the initial gear and a second weight for the propulsion parameter associated with the target gear; and
determining the weighted propulsion parameter based on weighting the value of the propulsion parameter associated with the initial gear by the first weight and the value of the propulsion parameter associated with the target gear by the second weight.

16. The method of claim 14, wherein determining the amount of torque further comprises:
determining, by a vehicle control unit, based on a mapping table mapping the weighted propulsion parameter to the amount of torque to be generated by the propulsion source, the amount of torque to be generated by the propulsion source.

17. The method of claim 13, wherein determining the amount of torque to be generated by the propulsion source during the shift from the initial gear to the target gear is further based on a speed of the vehicle.

18. The method of claim 13, wherein the initial gear and the target gear are separated by an intervening gear, wherein determining the amount of torque to be generated by the propulsion source is further based on a third pedal map for the intervening gear and the first pedal map for the initial gear at a first time, and wherein determining the amount of torque to be generated by the propulsion source is further based on the third pedal map for the intervening gear and the second pedal map for the target gear at a second time.

19. The method of claim 13, wherein the amount of torque is a first amount of torque, the target gear is a first target gear, and the position of the acceleration pedal is a first position, the method further comprising:
- prior to completing the shift from the initial gear to the first target gear, receiving an indication of an updated transmission ratio during a shift from the initial gear to a second target gear;
- after receiving the indication of the updated transmission ratio:
  - determining, by a vehicle control unit, based on a second position of the acceleration pedal, the first pedal map for the initial gear, and a third pedal map for the second target gear, a second amount of torque to be generated by the propulsion source during the shift to the second target gear; and
  - outputting, by the vehicle control unit and during the shift to the second target gear, one or more commands to control the one or more operating parameters of the propulsion source to generate the second amount of torque.

20. A computer-readable storage medium comprising instructions that, when executed by at least one processor of a computing device of a vehicle, cause the at least one processor to:
- determine an amount of torque to be generated by a propulsion source of the vehicle during a shift from an initial gear of a transmission of the vehicle to a target gear of the transmission, based on a position of an acceleration pedal of the vehicle, a first pedal map for the initial gear, and a second pedal map for the target gear, wherein the second pedal map is different than the first pedal map; and
- output, during the shift from the initial gear to the target gear, one or more commands to control one or more operating parameters of the propulsion source of the vehicle to generate the amount of torque.

* * * * *